(12) United States Patent
Erickson

(10) Patent No.: US 8,352,511 B2
(45) Date of Patent: Jan. 8, 2013

(54) SYSTEMS AND METHODS FOR PROVIDING A CONFIDENCE-BASED RANKING ALGORITHM

(75) Inventor: Douglas M. Erickson, Centerville, UT (US)

(73) Assignee: Partnet, Inc., Salt Lake City, UT (US)

( * ) Notice: Subject to any disclaimer, the term of this patent is extended or adjusted under 35 U.S.C. 154(b) by 498 days.

(21) Appl. No.: 12/200,562

(22) Filed: Aug. 28, 2008

(65) Prior Publication Data

US 2009/0063471 A1 Mar. 5, 2009

Related U.S. Application Data

(60) Provisional application No. 60/968,824, filed on Aug. 29, 2007.

(51) Int. Cl.
*G06F 7/00* (2006.01)
*G06F 17/30* (2006.01)

(52) U.S. Cl. .......... 707/803; 707/758

(58) Field of Classification Search ........ 707/758, 707/803
See application file for complete search history.

(56) References Cited

U.S. PATENT DOCUMENTS

| | | |
|---|---|---|
| 5,133,068 A | 7/1992 | Crus et al. |
| 5,321,833 A | 6/1994 | Change et al. |
| 5,384,894 A | 1/1995 | Vassiliadis et al. |
| 5,893,092 A | 4/1999 | Driscoll |
| 6,012,053 A * | 1/2000 | Pant et al. ............ 1/1 |
| 6,014,664 A | 1/2000 | Fagin et al. |
| 6,070,160 A | 5/2000 | Geary |
| 6,182,065 B1 | 1/2001 | Yeomans |
| 6,202,058 B1 | 3/2001 | Rose et al. |
| 6,317,741 B1 | 11/2001 | Burrows |
| 6,363,378 B1 | 3/2002 | Conklin et al. |
| 6,385,608 B1 * | 5/2002 | Mitsuishi et al. ........ 1/1 |
| 6,502,081 B1 * | 12/2002 | Wiltshire et al. ........ 706/12 |
| 6,701,312 B2 | 3/2004 | Lau et al. |
| 6,718,324 B2 | 4/2004 | Edlund et al. |
| 6,961,723 B2 | 11/2005 | Faybishenko et al. |
| 7,065,521 B2 | 6/2006 | Li et al. |
| 2002/0169764 A1 | 11/2002 | Kincaid et al. |
| 2003/0055835 A1 | 3/2003 | Roth |
| 2003/0208482 A1 | 11/2003 | Kim et al. |
| 2004/0024752 A1 | 2/2004 | Manber et al. |
| 2004/0139067 A1 * | 7/2004 | Houle ............ 707/3 |
| 2005/0203888 A1 | 9/2005 | Woosley et al. |
| 2006/0161534 A1 | 7/2006 | Carson, Jr. et al. |
| 2006/0288015 A1 | 12/2006 | Schirripa et al. |
| 2007/0136245 A1 * | 6/2007 | Hess et al. ............ 707/3 |

* cited by examiner

*Primary Examiner* — Shahid Alam
*Assistant Examiner* — Joshua Bullock
(74) *Attorney, Agent, or Firm* — Austin Rapp & Hardman

(57) ABSTRACT

A method for using a confidence based ranking algorithm is described. At least one search parameter is received. The at least one search parameter is used to identify at least one data record with confidence values. A results list with one or more data records is created. The results list is ordered according to the confidence values within the data records. The results list is sent.

20 Claims, 13 Drawing Sheets

| Product Name 534a | Description 534b | Price 534c | Image 534d |
|---|---|---|---|
| Rustic Gaucho Shirt 536a | This shirt is the color of a sunset... 536b | $39.00 536c | 536d |
| Puffy Shirt 538a | This white shirt is stylish... 538b | $42.00 538c | 538d |
| ... | ... | ... | ... |

FIG. 5

| Attribute 640a | Possibilities 640b | | Confidence value 640c | |
|---|---|---|---|---|
| Category | Casual Shirt | | 100% | |
| | Dress Shirt | 646a | 2% | 650a |
| | Work Shirt | | 60% | |
| Color | Red | | 95% | |
| | Blue | 646b | 10% | 650b |
| | Green | | 20% | |
| | White | | 1% | |
| Price | $39.00 | 646c | 100% | 650c |
| ID | Unique ID1 | 646d | 100% | 650d |
| Product Name | Rustin gaucho shirt | 646e | 100% | 650e |
| Description | This shirt is the color of a sunset | 646f | 100% | 650f |
| Image | [ - - - ] | 646g | 100% | 650g |
| Category | Casual Shirt | | 50% | |
| | Dress Shirt | 648a | 60% | 652a |
| | Work Shirt | | 5% | |
| Color | White | 648b | 100% | 652b |
| Price | $42.00 | 648c | 100% | 652c |
| ID | Unique ID2 | 648d | 100% | 652d |
| Product Name | Puffy Shirt | 648e | 100% | 652e |
| Description | This white shirt is stylish | 648f | 100% | 652f |
| Image | [ - - - ] | 648g | 100% | 652g |

FIG. 6

| Attribute 754a | Possibilities 754b | | Instance 754c | |
|---|---|---|---|---|
| Category | Casual Shirt<br>Dress Shirt<br>Work Shirt | 758a<br>756a | (1,100), (2, 50)<br>(1,2), (2,60)<br>(1,60), (2,5) | 760a |
| Color | Red<br>Blue<br>Green<br>White | 758b<br>756b | (1,95)<br>(1,10)<br>(1,20)<br>(1,1), (2,100) | 760b |
| Price | $39.00<br>$42.00 | 758c<br>756c | (1,100)<br>(2,100) | 760c |

FIG. 7

SYSTEMS AND METHODS FOR PROVIDING A CONFIDENCE-BASED RANKING ALGORITHM

RELATED APPLICATIONS

This application is related to and claims priority from U.S. Provisional Patent Application Ser. No. 60/968,824 filed Aug. 29, 2007, for "Confidence-Based Ranking Algorithm," with inventor Douglas M. Erickson, which is incorporated herein by reference.

TECHNICAL FIELD

The present disclosure relates generally to searching databases. More specifically, the present disclosure relates to preparing and using a system with a confidence based ranking algorithm for searching databases.

BACKGROUND

With the growth of the internet, there is more data available to internet users than ever before. However, even as the amount of data grows, retrieval of data has become increasingly difficult. Specifically, retrieval of useful data. The ability to find and retrieve useful data is not prized only over the internet, but also for closed networks that need to find specific data in their local databases. No matter what the environment, computer users want a complete set of results without including so much data that it becomes unusable.

One of the problems is the accuracy of data. With so much data, there are many possible reasons that a user's search request might not produce all the qualifying data. Other systems have used term frequency within a document to assess its usefulness, however, this may omit certain documents from consideration. On the other hand, an over-inclusive search engine that makes no distinctions between useful and useless data is equally problematic. Therefore, a need exists for a system that produces an inclusive and usable search results list.

BRIEF DESCRIPTION OF THE DRAWINGS

FIG. 5 is an embodiment of data in a database before classifier processing;

FIG. 6 is an embodiment of data in a database after classifier processing;

FIG. 7 is an embodiment of data in an inverted index;

DETAILED DESCRIPTION

Figure 1:
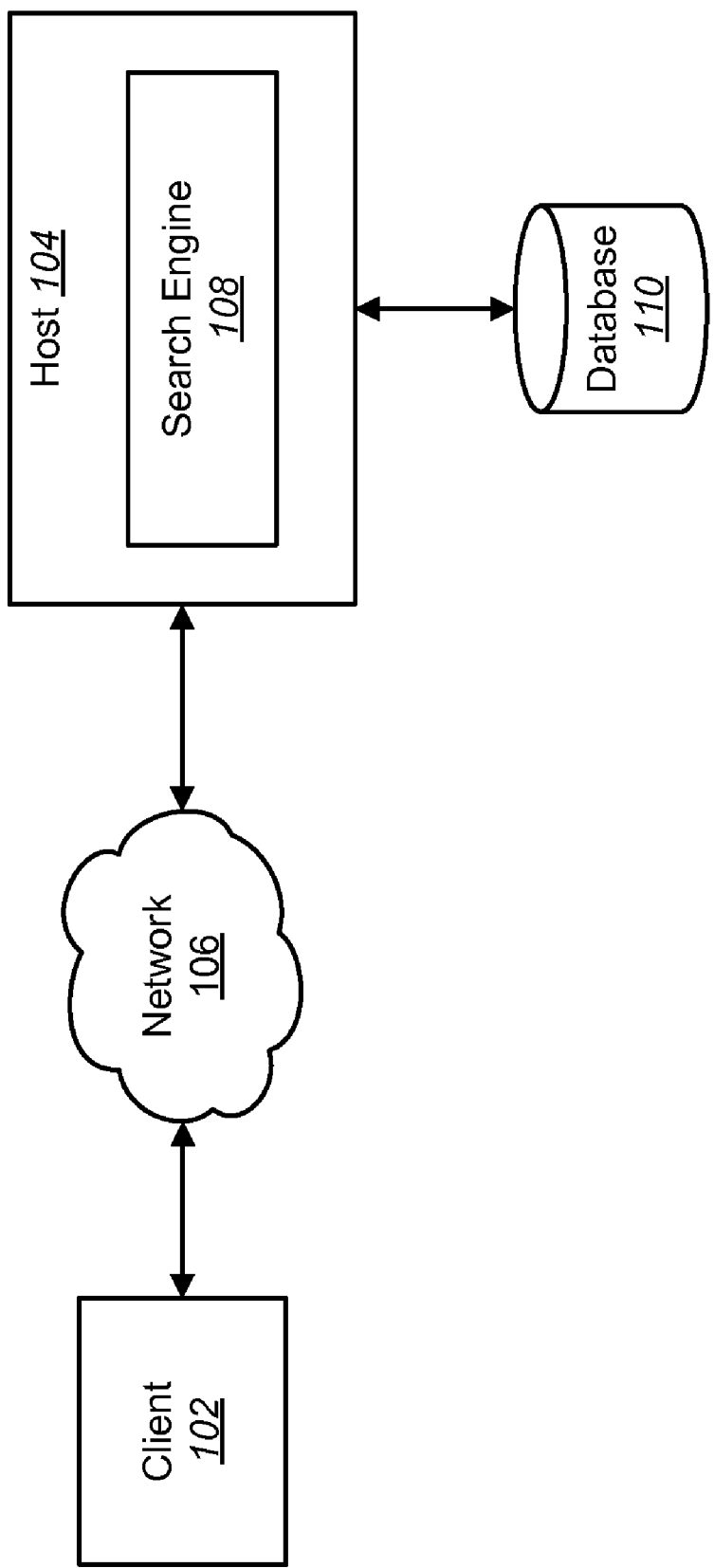
FIG. 1 is an embodiment of a system for implementing a confidence based ranking algorithm.

A method for preparing a system with a confidence based ranking algorithm is disclosed. At least one data record is received. A confidence value is determined for each attribute value in each data record. The determining comprises evaluating the accuracy of each attribute value. The confidence values are associated with the attribute values for each data record. The attribute values and their associated confidence values are stored for each data record. A searchable data structure is created based on the attribute values and their associated confidence values.

Receiving at least one data record may include receiving non-uniform data records from more than one source. The data may be combined into a single data structure. Non-uniform data records may be mapped into uniform records. Associating may include using a unique identifier for each record. The searchable data structure may be an inverted index sorted by unique identifier and attribute value.

A method for using a confidence based ranking algorithm is disclosed. At least one search parameter is received. The at least one search parameter is used to identify at least one data record with confidence values. A results list is created with one or more data records. The results list is ordered according to the confidence values within the data records. The results list is sent.

Identifying a data record may include identifying a unique identifier associated with the data record. Creating may include only adding qualifying data records. A qualifying data record may have at least one attribute value corresponding to a search parameter with a confidence greater than zero. A data record with an attribute value with a higher confidence value corresponding to a search parameter may be inserted before a data record with an attribute value with a lower confidence value corresponding to a search parameter in the results list.

An apparatus for preparing a system with confidence based ranking algorithm is disclosed. The apparatus includes a processor and memory in electronic communication with the processor. Executable instructions are stored in the memory. At least one data record is received. A confidence value is determined for each attribute value in each data record. Determining comprises evaluating the accuracy of each attribute value. The confidence values are associated with the attribute values for each data record. The attribute values and their associated confidence values are stored for each data record. A searchable data structure is created based on the attribute values and their associated confidence values.

An apparatus with a confidence based ranking algorithm is disclosed. The apparatus includes a processor and memory in electronic communication with the processor. Executable instructions are stored in the memory. At least one search parameter is received. The at least one search parameter is used to identify at least one data record with confidence values. A results list is created with one or more data records. The results list is ordered according to the confidence values within the data records. The results list is sent.

A computer readable medium with instructions for using a system with a confidence based ranking algorithm is disclosed. At least one search parameter is received. The at least one search parameter is used to identify at least one data record with confidence values. A results list is created with one or more data records. The results list is ordered according to the confidence values within the data records. The results list is sent.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is an embodiment of a system for implementing a confidence based ranking algorithm. In the system a client 102 communicates with a host 104 through a network 106. The client 102 may be any device capable of communicating with a host 104. The network 106 may be wired or wireless and may use any available protocol to pass data between the client 102 and the host 104. Alternatively, the client 102 may be connected directly to the host 104. The client 102 and the host 104 may be combined into one device. The host 104 has a search engine 108 that will be discussed in detail below. The host 104 also communicates with a database 110, which may alternatively be implemented as part of the client 102 or the host 104 in any way known in the art.

Figure 2:
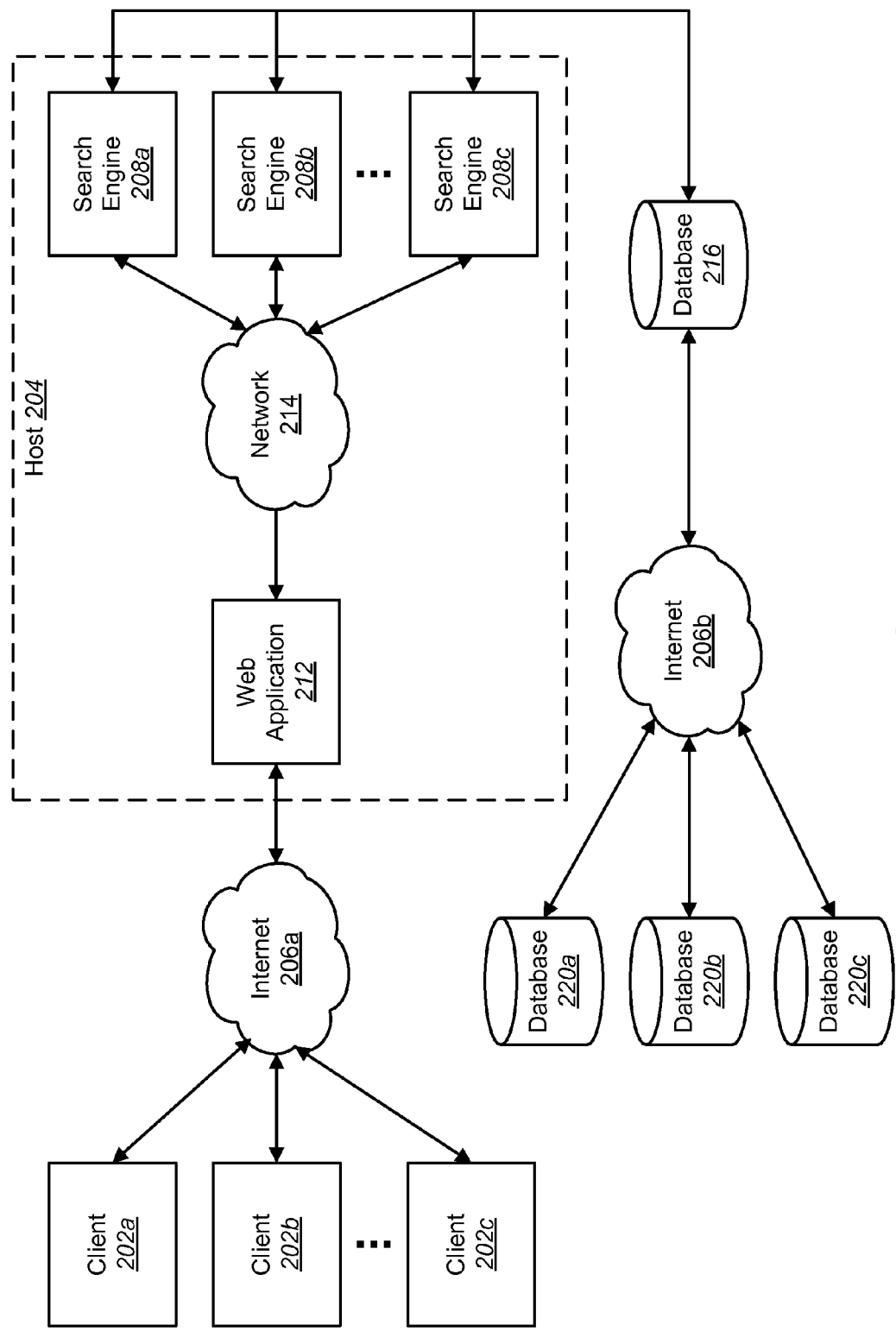
FIG. 2 is another embodiment of a system for implementing a confidence based ranking algorithm.

FIG. 2 is another embodiment of a system for implementing a confidence based ranking algorithm. In this embodiment, there are multiple clients 202 communicating with the host 204 over the internet 206a using HTTP (Hypertext Transfer Protocol). The host 204 may have a web application 212 that communicates with the clients 202 over the internet 206a. The web application 212 may also communicate with multiple search engines 208 over a network 214. Alternatively, the web application 212 may not reside on the host 204. The network 214 may be a local area network using any protocol known in the art, such as Remote Method Invocation (RMI) or other proprietary non-HTTP protocols used to maximize efficiency in a local area network. The search engines 208 may be distinct modules as shown or they may be part of the same module. Each search engine 208 may perform the same function or may be directed to only a portion of the overall functionality of the combined search engines. In other words, the search engines 208 may each search an entire central database 216 or they may each search only a mutually exclusive portion of a central database 216. The search engines 208 may communicate with a central database 216, which communicates over the internet 206b with one or more supplier databases 220. These supplier databases 220 periodically send data to the central database 216 for processing that will be discussed below.

Typically, the central database 216 comprises a set of records, where each record consists of a set of fields, or attributes. A label on each attribute describes its contents. Each record may be a virtual representation of some real entity, with each attribute describing a different characteristic of the real entity. This structure and usage is typical of most database models used today. The central database 216 may also include unstructured data. One example of unstructured data is unstructured text. Examples and configurations herein referring to databases and/or records include various kinds of data, including structured data, unstructured data (such as unstructured text), etc.

Figure 3:
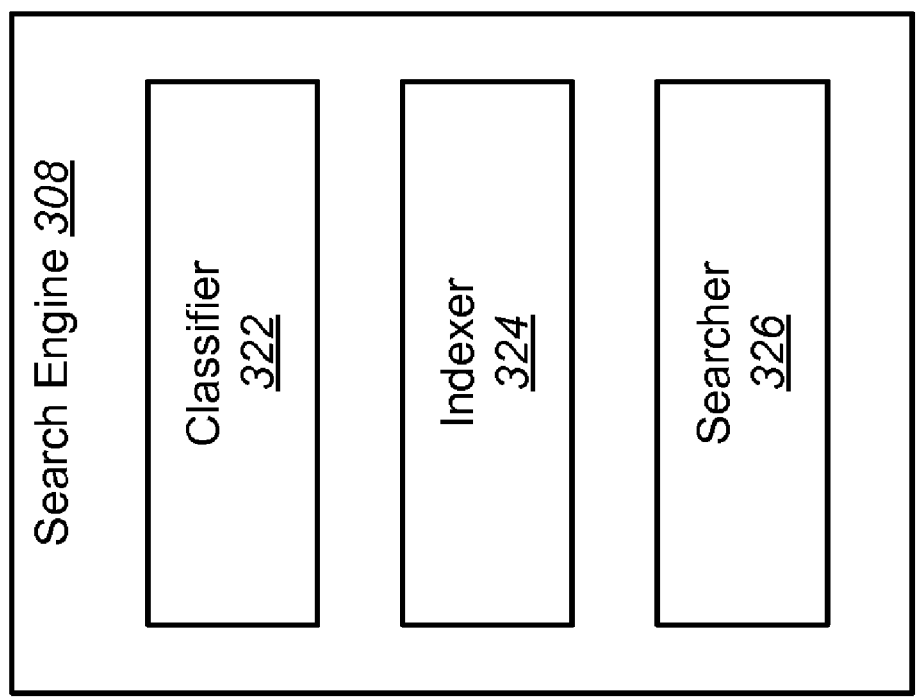
FIG. 3 is a block diagram of a search engine.

FIG. 3 is a block diagram of a search engine 308. The search engine 308 may include a classifier 322, an indexer 324, and a searcher 326. The classifier 322 is responsible for assigning values with associated confidence values to each attribute in a record and a unique identifier for each record. The indexer 324 creates an inverted index from the output of the classifier 322. The searcher 326 resolves the data to be fetched, fetches the data, and sends the data to the web application for rendering before it is sent to the user. These structures and methods will be discussed in further detail below.

Note that the systems and methods described herein may be used for preparing databases for and using systems with a confidence based ranking algorithm. Although there is some overlap between preparing databases for use by the system and using the system, they may be implemented together or independent of each other.

Figure 4:
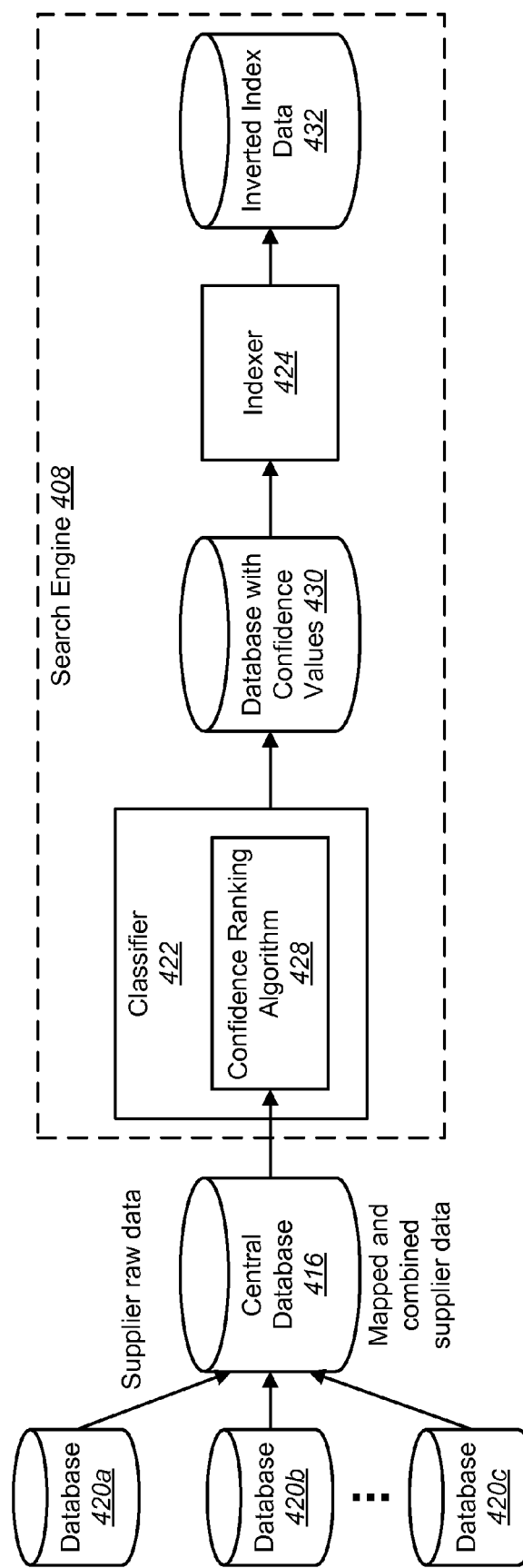
FIG. 4 is a block diagram of an embodiment preparing a system with a confidence based ranking algorithm.

FIG. 4 is an embodiment of preparing a system with a confidence based ranking algorithm. First, the supplier databases 420a-c may send raw data to a central database 416. The data is raw in the sense that it is non-uniform data because each supplier may have different naming conventions, file structure, etc. The central database 416 may then combine and map the supplier data to create a single, uniform database. The central database 416 typically does not alter the attribute values.

The central database 416 may also include unstructured data, such as unstructured text. Whether the central database 416 includes structured data or unstructured data (such as unstructured text), the systems and methods described herein may operate similarly. "Unstructured text" may be thought of as a degenerate case where a table or database includes only one field. The systems and methods herein are not limited to assigning one classification per field. For example, from a single field (of unstructured text) like "Long description", one may assign attributes of product category, color, material, and others.

Note that the search engine 408 comprises an inverted index 432, but not necessarily the classifier 422, an indexer 424, or the database with confidence values 430. The classifier 422, indexer 424, database with confidence values 430 and the inverted index 432 may be implemented as part of the search engine 408 or central database 416 or independent of the search engine 408 and central database 416. Additionally, they may be implemented together.

Next, the classifier 422 assigns attribute values with associated confidence values for each record in the central database 416. This is done using a confidence ranking algorithm 428. The confidence value is an assessment of the accuracy of the value in the field. As an example, if a record described a "mens shirt" that was sold by a retailer and one of the attributes was given a label of "color" and a value of "sunset," then it would not be clear whether the shirt was "red," "green," "blue," or another color. One traditional method of preparing a database would require a determination at some point as to which color to equate "sunset" with. A determination based on a best guess would be made. For instance, some logic would determine that it is most likely that "sunset" equates to "red" rather than "blue" or "green" even though it is possible that "sunset" is closer to "blue" or "green" than "red." But since it is most likely that "sunset" is closer to "red" than any other color, a traditional system might treat "sunset" as "red" and any search tools would only find the "mens shirt" if they searched for "red" or "sunset."

The confidence ranking algorithm 428, however, takes a more inclusive approach. The classifier 422 associates the confidence values from the confidence ranking algorithm 428 with their corresponding attribute values and stores the records in a database with confidence values 430. Depending on the search tool using this database, the user may see all the possible records and they are able to decide for themselves. For the same "mens shirt" example above, the confidence ranking algorithm 428 makes a determination that it doesn't know exactly what to equate "sunset" with, so it assigns a confidence value for each of the possibilities. Perhaps "red" is assigned a higher confidence value than "blue" or "green," but all the colors are stored as part of the record in the database with confidence values 430. Methods of assigning confidence values that may be implemented in the confidence ranking algorithm 428 are known in the art and will be discussed in further detail in FIG. 8 and the accompanying description.

Lastly, the classifier 422 may add a unique identifier to each record. This may be a string of any identifying characters. The only requirement is that each record's unique identifier is unique. Alternatively, the unique identifier may already be a part of the raw data sent from the supplier databases 420. An example of a unique identifier sent from the supplier databases 420 is an International Standard Book Number, or ISBN, for a record describing a book that the supplier sells. The unique identifier will help the searcher 326 quickly retrieve the complete record at a later stage.

Next, the indexer 424 uses the database with confidence values 430 to create an inverted index 432. This is a technique commonly used in information retrieval, wherein the indexer 424 maps each distinct attribute value to all the records in which they appear. This may be done by using a unique identifier that is embedded in each record by the classifier 422. In contrast to this traditional inverted indexing, however, the indexer 424 appends the confidence value to the record unique identifier instead of a measurement of term frequency. For each distinct attribute value found in the database with confidence values 430, the indexer 424 compiles a sorted list of ordered pairs where the first value is the unique identifier of the record where the attribute value is found, and the second value is the confidence value for that instance of the attribute value. This mapping from attribute values to sorted lists of ordered pairs is stored as the inverted index 432.

FIG. 5 is an embodiment of data in a database before classifier processing. This might correspond to the data in the central database 416 in FIG. 4. The attribute labels 534 might be "product name," "description," "price," or "image." These attribute labels in the raw data sent from the supplier databases 420 may be changed by the central database 416 to create a uniform central database 416. For instance, if supplier A (not shown) sends records with an attribute labeled "item description" and supplier B (not shown) sends records with an attribute labeled "product description," both of these labels might be changed to "description" for the sake of uniformity by the central database 416.

The attribute values 536, 538 are the values relating to the label for each record. For instance, the first record has an attribute value of "rustic gaucho shirt" 536a for the label "product name" 534a, an attribute value of "this shirt is the color of the sunset" 536b for the label "description" 534b, and an attribute value of "$39.00" 536c for the label "price" 534c. Additionally, the first record may have an image 536d for the label "image." There may be many records in the central database 416 with many attribute labels. Unlike the labels 534, the attribute values 536, 538 will likely not be modified by the central database 416.

FIG. 6 is an embodiment of data in a database after classifier processing. This might correspond to the database with confidence values 430 in FIG. 4. This data has been transformed from a set of records in the central database 416, embodied in FIG. 5, to a set of attributes with their associated values and confidence values for each record. The classifier 422, unlike the central database 416, might alter the attribute values as it reorganizes the data. The new labels 640 are now "attribute" 640a, "possibilities" 640b and "confidence" 640c. Unlike the central database 416, the records will likely have these three labels. The attribute values 642 for the "attribute" label 640a will loosely correspond to the labels 534 in FIG. 5, with a few changes. For instance, the "category" 642a, "color" 642b, and possibly the "ID" 642d attribute values might be added by the classifier 422 during processing because they are commonly used in searching. There may be many attribute values 642 for the "attribute" label. However, each added attribute value 642 that doesn't appear as an attribute label 534 in the central database 416 will likely relate to a characteristic that is searched upon. Also, the classifier 422 will likely not delete any data, even data that is not searched upon, like an image. Therefore, the database with confidence values 430, where the output of the classifier is stored, will have at least as much data, and likely more data, than the central database 416.

The attribute values for the label "possibilities" 640b may be extracted from other data or may include all possibilities. This may be done autonomously or manually. For instance, the classifier 422 may determine from the "rustic gaucho shirt" attribute value 536a that the only possibilities for such a "product name" are "casual shirt," "dress shirt," or "work shirt" 646a. Alternatively, the classifier could simply include all the possibilities, even those with a "0%" confidence rating (not shown). Likewise, the classifier could extract the attribute values for "color" from the "description" attribute values 536b, 538b. The classifier might automatically interpret the term "sunset" as possibly "red," "blue," "green," or "white" 646*b* or it might include all possibilities for colors, even those with a "0%" confidence rating (not shown).

The classifier 422 also adds the confidence values 650, 652 for every attribute value listed 646, 648. The confidence values 650, 652 are generated by a confidence ranking algorithm 428. Some of the confidence values 650, 652 may be supplied by the supplier databases 420. For instance, if the raw data from the supplier databases 420 gives a price 642*c* of "$39.00" 646*c*, the classifier 422 may assign a "100%" confidence value 650*c*. Likewise, the unique identifier 642*d* of "unique IDl" 646*d* will likely be given a "100%" confidence value 650*d*, either because it is provided by the supplier database 420 or it is simply assigned by the classifier 422 itself.

Generally speaking, the data that is taken directly from the central database 416, with no processing or further extraction done, will be assigned a "100%" confidence value. For instance, the attribute values for "product name" 642*e*, 644*e*, "description" 642*f*, 644*f*, and "image" 642*g*, 644*g* may be assigned a confidence value of "100%" 650*e*, 650*f*, 650*g*, 652*e*, 652*f*, 652*g* since the values are taken directly from the central database 416 without any processing or extraction. The output of the classifier 422 is stored in the database with confidence values 430.

FIG. 7 is an exemplary embodiment of data in an inverted index 432. This might correspond to the inverted index 432 in FIG. 4. This data has been transformed from database with confidence values 430 by the indexer 424 into a list of all the terms in the data mapped to the record in which they appear. This is a common technique used in the art to facilitate fast searching. In addition, though, the invention combines the associated confidence value, rather than the term frequency, with each unique identifier in an ordered pair. In this way, a search tool may later send ordered results to a user based on confidence values instead of term frequency.

The attribute labels 754 may loosely map to the attribute labels in the database with confidence values 640, except the unique identifier is now listed in an ordered pair with the confidence value 760 in the inverted index 432. The ordered pairs 760 are sorted by unique identifier to enable a search tool to resolve the data it wants to find. The attribute values 756 for the "possibilities" attribute label may contain every value with a confidence greater than zero 758 from the database with confidence values 430.

Additionally, the attribute values 756 for the "attribute" label 754*a* should map to the same in the database with confidence values 642, 644, except that the indexer 424 may not include all data in the inverted index 432. For instance, data that will not be searched upon, like an image, may not be included. Additionally, the indexer 424 may insubstantially modify the data in the interest of creating an inverted index 432 that is quickly searchable. For instance, the indexer 424 may convert all text to lower case. This will allow for quicker searching because "Red" and "red" will not appear twice in the inverted index 432. But, this modification prevents a search tool from later reconstructing the original data from the data in the inverted index 432 since it is unknown whether a given record contains "Red" or "red."

Figure 8:
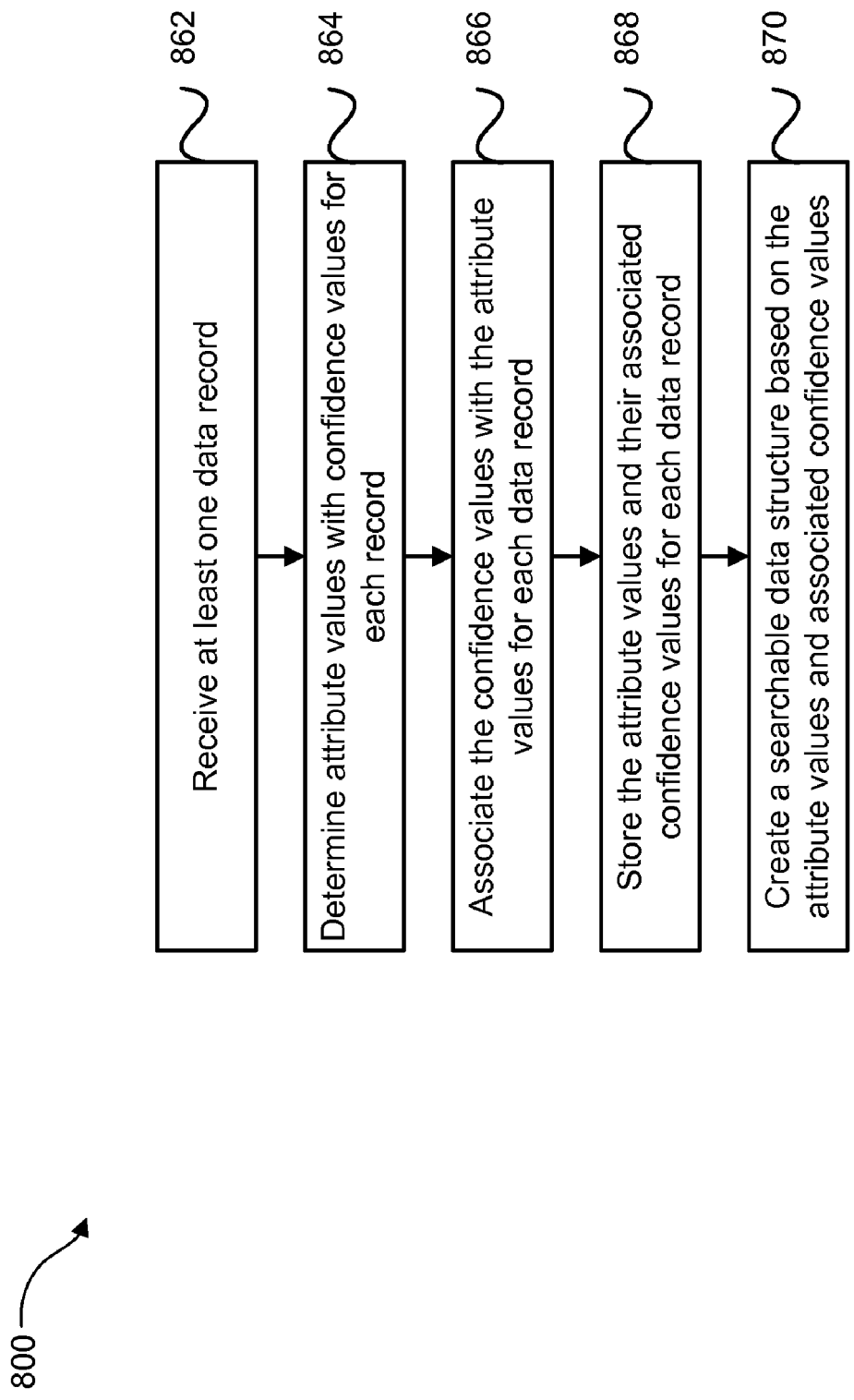
FIG. 8 is a flow diagram of the method for preparing a system with a confidence based ranking algorithm.

FIG. 8 is a flow diagram of the method 800 for preparing a system with a confidence based ranking algorithm. First, at least one data record is received 862. The data may be raw, meaning that it is non-uniform. In that case, the data may be mapped to a uniform naming convention. Likewise, if the data is from multiple sources, the data may be combined before proceeding to the next step.

Next, attribute values with associated confidence values for each record are determined 864. Methods of determining confidence values to data are known in the art. This may involve comparing the value in a field with a set of records with known classifications. This step may be performed by a confidence ranking algorithm 428 within a classifier 422. A confidence ranking algorithm 428 may comprise manual assignment by an individual, the consensus of a group, automated statistical analysis by a computing device, metrological analysis, or a combination of these. Any method that assesses the accuracy of data may be used. For instance, if the record was for a chemical at purity X, the confidence ranking algorithm 428 may consider the type of process used to produce the chemical, the reputability of the producer, the difficulty in producing an accurate purity of the chemical, or some combination of these factors. Additionally, the confidence value may be assigned by the supplier before it is received. The attribute values may be determined 864 immediately after the data is received 862 or they may be determined periodically, for instance once per day, independent of the frequency at which the data is received 862.

The confidence values may use any weighting number system. In particular, the confidence value may be normalized so that confidence-based terms can be combined with traditional term-frequency-based terms in record ranking formulas known in the art. The examples contained herein are expressed as percentile, but any expression that allows relative comparisons may be used. As an example, the classifier may assign a confidence of "95%" to the value "red," "10%" to the value "blue," and "20%" to the value "green" in the "color" attribute of a "mens shirt" record. The sum of all the confidences for values in a given attribute may exceed 100%. In this example, the confidence values sum to 125%, but they are still useful because it tells a search tool (not shown) that the confidence ranking algorithm believes that the "color" is most likely "red," then "green," then "blue." Thus, the search tool may display the "mens shirt" when a "color" other than "red" is searched for to let the user determine the "color" for themselves.

Next, the confidence values are associated 866 with the attribute values to which they correspond. Any method of associating data known in the art may be used. The only requirement is that the confidence values are linked somehow with the attribute values to which they correspond. For example, this may be done by appending the confidence values to the existing data, creating a new data structure that comprises the received data and the confidence values, or a combination. Additionally, this association may utilize a unique identifier for each data record. If the record has no unique identifier, it might be added here.

The attribute values and their associated confidence values may then be stored 868. This may be done in a database with confidence values according to FIG. 6. As discussed previously, a database with confidence values may be implemented as part of a search engine, part of a central database, or independent of both. Lastly, a searchable data structure is created 870 based on the attribute values and associated confidence values. This may be implemented with an inverted index, according to FIG. 7, where a list of all the distinct terms appearing in attribute values are mapped to the data record in which they appear by using a unique identifier for each record. Additionally, instead of appending the term frequency, as is traditional, the confidence value may be appended to the unique identifier. The searchable data structure, then, may comprise a list of ordered pairs, where the first value is the unique identifier in which a particular attribute value appears, and the second value is the confidence value for that particular instance of the attribute value. The list may be sorted for each attribute value by either the unique identifier, as shown in FIG. 7, or by the confidence value.

Figure 9:
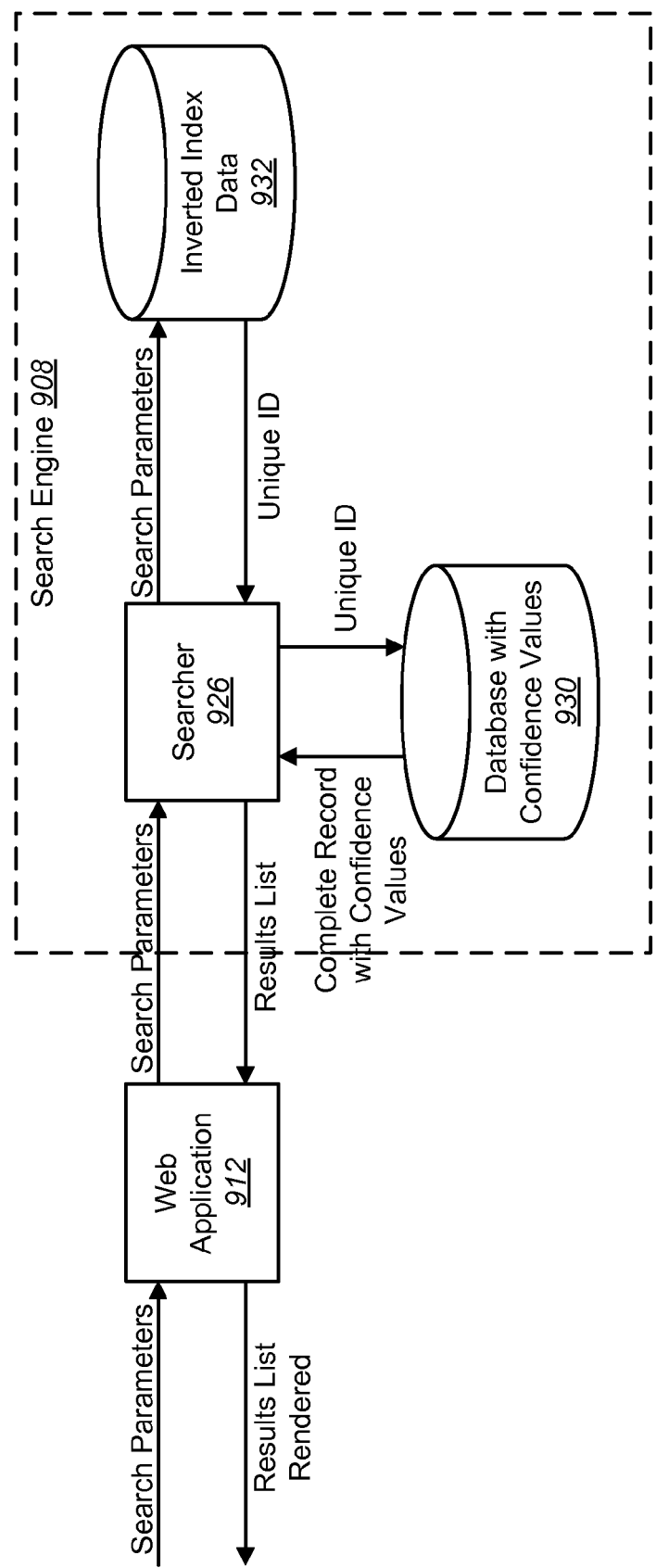
FIG. 9 is an embodiment of a system with a confidence based ranking algorithm.

FIG. 9 is an embodiment of using a system with a confidence based ranking algorithm. Note there is some overlap in the preparing and using the systems with confidence based ranking algorithms. Also, the different functional blocks may be implemented as shown in FIG. 9 or in another way. First, a web application 912 may receive search parameters. These search parameters may be received from a user over a network, like the internet. Additionally, the web application 912 may be required to extract the search parameters if they are embedded in unrelated data before sending them to the searcher 926 in a search engine 908. The searcher 926 has three functions: resolve the data, retrieve the data, and send the data to the web application 912.

First, the searcher 926 resolves the data searched for by searching the inverted index 932 based on the search parameters. The inverted index 932 may comprise a list of ordered pairs, where the first value is the unique identifier in which a particular attribute value appears, and the second value is the confidence value for that particular attribute value. The list may be sorted for each attribute value by either the unique identifier, as shown in FIG. 7, or by the confidence value. This step merely resolves, or identifies, the record, but does not fetch the record from the inverted index 932. The reason for this is that there may have been some data lost, either intentionally or unintentionally during the creation of the inverted index 932 as discussed above. For instance, image data might not be included since it is not searched upon or there may have been some data conversion, for instance from capital letters to lower case letters, making it impossible to recreate the original data. These reasons make it impossible to retrieve original data from the inverted index 932.

Therefore, once the searcher 926 has resolved the desired data, it uses a unique identifier associated with the desired data in the inverted index 932 to locate and retrieve the complete record from the database with confidence values 930. The searcher 926 may use these complete records to compile a results list. Compiling a results list may involve ordering each record according to the confidence value. In this respect, the results list here may provide a more complete and inclusive results list than some traditional methods, which ordered the records based on term frequency. Lastly, the searcher 926 sends the complete record to the web application 912 to be rendered. This rendering may be for display to a user. For example, the web application 912 may render the results list into HTML for display over the internet.

Figure 10:
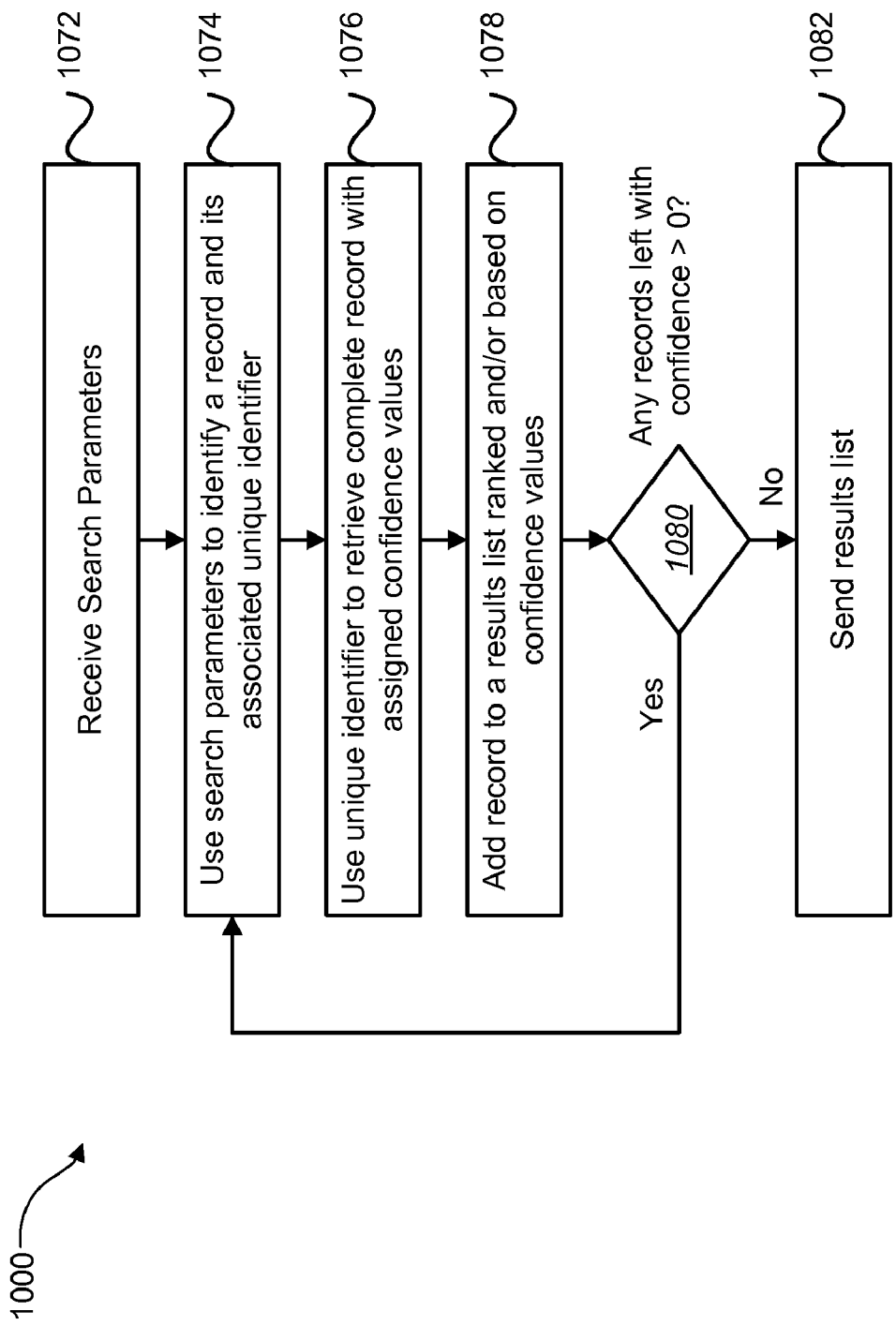
FIG. 10 is a flow diagram of the method of using a system with a confidence based ranking algorithm.

FIG. 10 is a flow diagram of the method 1000 of using a system with a confidence based ranking algorithm 428. First, search parameters are received 1072. These search parameters may identify characteristics of desired data, such as attribute values of a data record that is searched for. The search parameters may be in any format known in the art. The system may then use 1074 the search parameters to identify a data record and its associated unique identifier. This data record might be identified 1074 using an inverted index. The system may then use 1076 the unique identifier to retrieve the complete version of the record with assigned confidence values. This may involve retrieving 1076 the complete record with assigned confidence values from a database with confidence values.

Next, the system may add 1078 the record to a results list ranked and/or based on confidence values. These records may be ranked in the results list according to their confidence values. For instance, if records A and B, were in the results list with confidences of "80%" and "10%," respectively, the system might place a new record C with a confidence value of "50%" in between records A and B. Therefore, the results list might be ordered record A first, record C second, and record B third, in descending order of confidence. In this respect, the system provides a results list that is both useful, since the results with highest confidence will be provided first, and inclusive, since record B is included despite its low confidence.

The system may then determine 1080 if there are any other records fitting the search parameters with a confidence greater than zero. This may involve going back to the inverted index and searching based on the search parameters. If there are records left, the system may identify 1074 the record and its associated unique identifier, retrieve 1076 the complete record, and add 1078 the record to the results list ranked by confidence value. If, however, there are no more qualifying records, the results list is sent 1082 to the requester. This may be a web application that renders the results list for display to a user. For example, the web application may render the results list in HTML for display over the internet.

Figure 11:
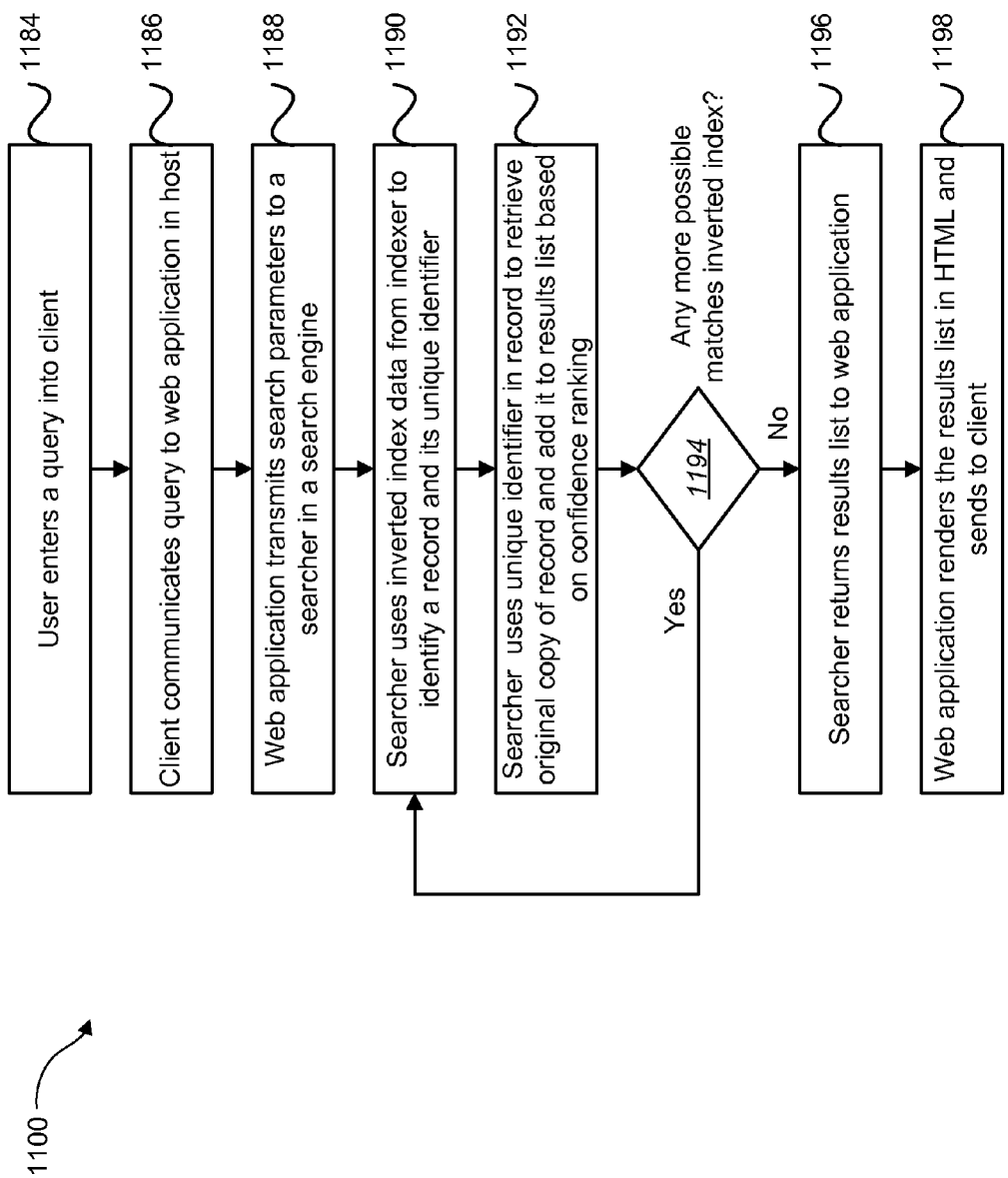
FIG. 11 is another flow diagram of the method of using a system with a confidence based ranking algorithm.

FIG. 11 is another flow diagram of the method 1100 of using a system with a confidence based ranking algorithm 428. First, a user enters 1184 a query into a client. This may consist of entering input into a web page, such as a search request comprising search parameters, such as attribute values for a desired data record. The client may then communicate 1186 the query to a web application in a host. This may include transmitting a search request over a network, such as the internet. The web application may then transmit 1188 the search parameters to a searcher within a search engine. The searcher may then identify 1190 a record and its unique identifier in an inverted index using the search parameters. Once the searcher has identified a record, it may then use 1192 the unique identifier to retrieve the original record and add it to a results list. As discussed before, the inverted index may not have all of the original record for several reasons. Because of this, the searcher may go to a database with confidence values to retrieve the original record. The records in the results list may be ranked according to their confidence values. Specifically, the records with higher confidence values relating to the search parameters may be inserted before those with lower corresponding confidence values.

The system may check to determine 1194 if the inverted index has any more record matches for the received search parameters. If it does, the searcher may search 1190 the inverted index again to find identify a record and its unique identifier, retrieve the original copy of the record, and add 1192 it to the results list. If there are no more record matches for the received search parameters, the searcher may return 1196 a results list to the web application. The web application may then render 1198 the results list in HTML and return it to the client.

Figure 12:
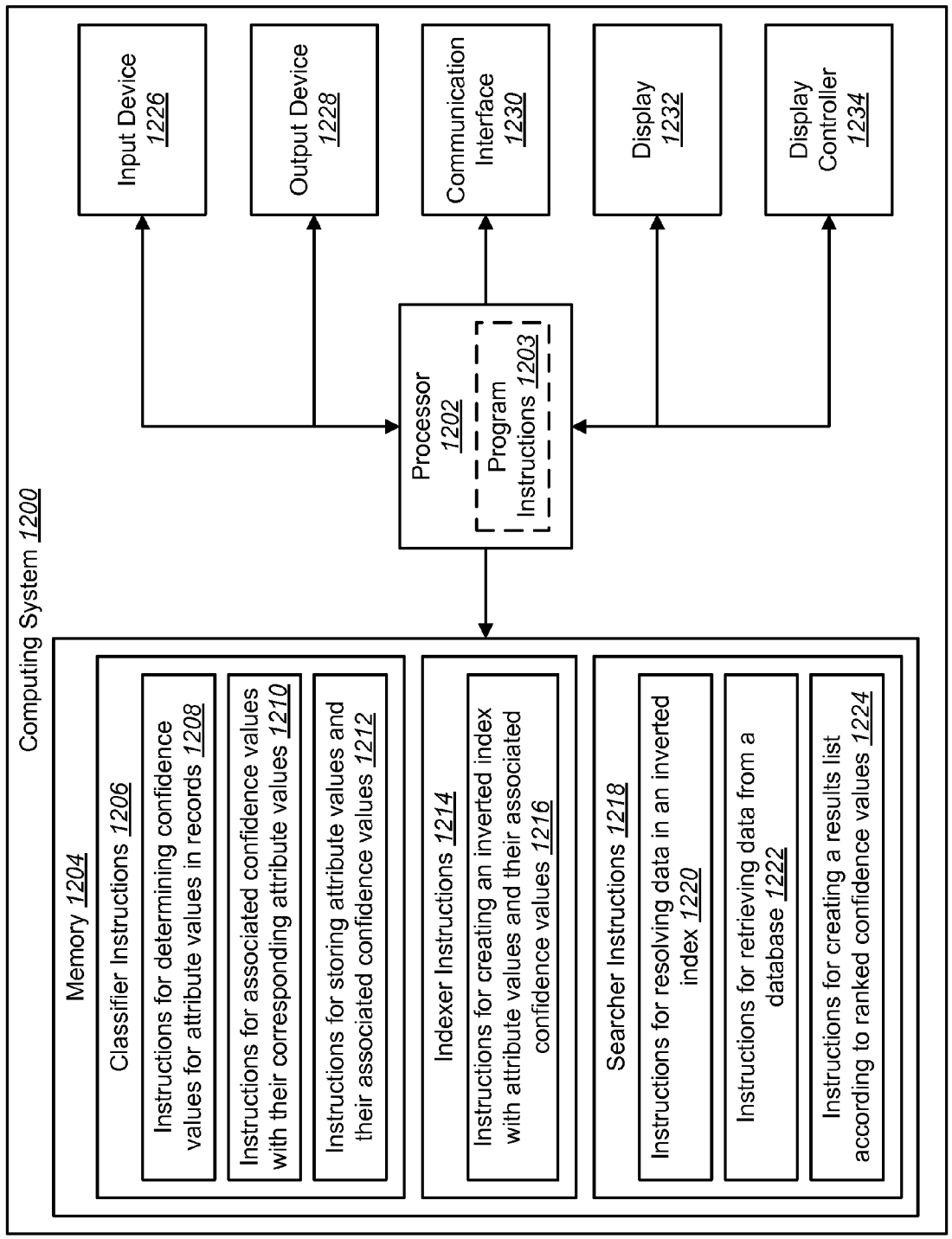
FIG. 12 is a block diagram illustrating the components typically utilized in a computing system used with embodiments herein.

FIG. 12 is a block diagram illustrating the components typically utilized in a computing system 1200 used with embodiments herein. The illustrated components may be logical or physical and may be implemented using any suitable combination of hardware, software, and/or firmware. In addition, the different components may be located within the same physical structure or in separate housings or structures.

The computing system 1200 includes a processor 1202 and memory 1204. The processor 1202 controls the operation of the computer system and may be embodied as a microprocessor, a microcontroller, a digital signal processor (DSP) or other device known in the art. The processor 1202 typically performs logical and arithmetic operations based on program instructions stored within the memory 1204.

As used herein, the term "memory" 1204 is broadly defined as any electronic component capable of storing electronic information, and may be embodied as read only memory (ROM), random access memory (RAM), magnetic disk storage media, optical storage media, flash memory devices in RAM, on-board memory included with the processor 1202, EPROM memory, EEPROM memory, registers, etc. The memory 1204 typically stores program instructions and other types of data.

For instance, the memory 1204 in a computing system 1200 that implements the invention may include instructions for a classifier 1206, an indexer 1214, and/or a searcher 1218. The classifier instructions 1206 might further include instructions for determining confidence values 1208, associating confidence values with attribute values 1210, and storing attribute values with their associated confidence values 1212. The indexer instructions 1214 might further include instructions for creating an inverted index 1216. The searcher instructions 1218 might further include instructions for resolving data 1220, retrieving data 1222, and creating a results list from ranked confidence values 1224. Also, the processor 1202 may execute program instructions 1203 to implement some or all of the methods disclosed herein.

The computing system typically also includes one or more communication interfaces 1230 for communicating with other electronic devices. The communication interfaces 1230 may be based on wired communication technology, wireless communication technology, or both. Examples of different types of communication interfaces 1230 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1200 typically also includes one or more input devices 1226 and one or more output devices 1228. Examples of different kinds of input devices 1226 include a keyboard, mouse, microphone, remote control device, button, joystick, trackball, touchpad, lightpen, etc. Examples of different kinds of output devices 1228 include a speaker, printer, etc. One specific type of output device which is typically included in a computer system is a display device 1232. Display devices 1232 used with embodiments disclosed herein may utilize any suitable image projection technology, such as a cathode ray tube (CRT), liquid crystal display (LCD), light emitting diode (LED), gas plasma, electroluminescence, or the like. A display controller 1234 may also be provided, for converting data stored in the memory 1204 into text, graphics, and/or moving images (as appropriate) shown on the display device 1232.

Of course, FIG. 12 illustrates only one possible configuration of a computing device 1200. Those skilled in the art will recognize that various other architectures and components may be utilized. In addition, various standard components are not illustrated in order to avoid obscuring aspects of the invention.

Figure 13:
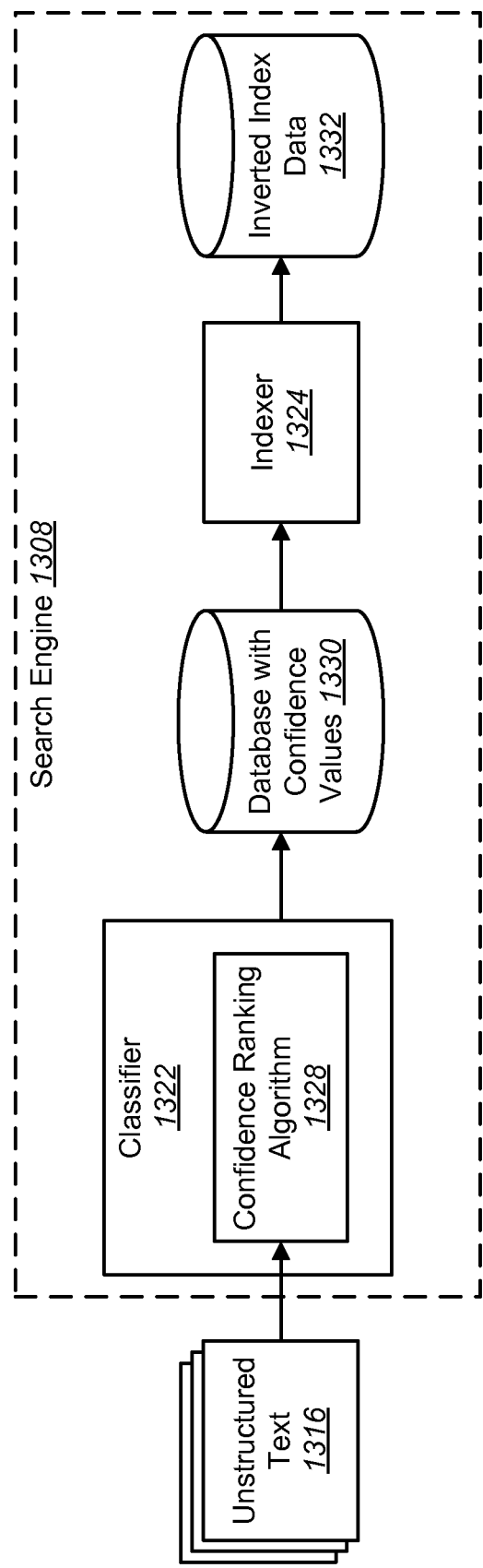
FIG. 13 is an embodiment of preparing a system with a confidence based ranking algorithm.

FIG. 13 is a block diagram of a configuration of preparing a system with a confidence based ranking algorithm. In the configuration shown in FIG. 13, unstructured text 1316 is the data that is being used.

Note that the search engine 1308 comprises an inverted index 1332, but not necessarily the classifier 1322, an indexer 1324, or the database with confidence values 1330. The classifier 1322, indexer 1324, database with confidence values 1330 and the inverted index 1332 may be implemented as part of the search engine 1308 or unstructured text data/database 1316 or independent of the search engine 1308 and unstructured text 1316. Additionally, they may be implemented together.

Next, the classifier 1322 assigns attribute values with associated confidence values for each record in the unstructured text 1316. This is done using a confidence ranking algorithm 1328. The confidence value is an assessment of the accuracy of the value in the field.

The classifier 1322 associates the confidence values from the confidence ranking algorithm 1328 with their corresponding attribute values and stores the records in a database with confidence values 1330. Depending on the search tool using this database, the user may see all the possible records and they are able to decide for themselves.

Lastly, in addition to assigning a confidence value to the value in each field, the classifier 1322 may add a unique identifier to each record. This may be a string of any identifying characters. The only requirement is that each record's unique identifier is unique. Alternatively, the unique identifier may already be a part of the raw data sent from the supplier databases (not shown in FIG. 13).

Next, the indexer 1324 uses the database with confidence values 1330 to create an inverted index 1332. This is a technique commonly used in information retrieval, wherein the indexer 1324 maps each distinct attribute value to all the records in which they appear. This may be done by using a unique identifier that is embedded in each record by the classifier 1322. In contrast to this traditional inverted indexing, however, the indexer 1324 appends the confidence value to the record unique identifier instead of a measurement of term frequency. For each distinct attribute value found in the database with confidence values 1330, the indexer 1324 compiles a sorted list of ordered pairs where the first value is the unique identifier of the record where the attribute value is found, and the second value is the confidence value for that instance of the attribute value. This mapping from attribute values to sorted lists of ordered pairs is stored as the inverted index 1332.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the terms "code" and "instructions" should be interpreted broadly to include any type of computer-readable statement(s) or processor-readable statement(s). For example, the terms "code" and "instructions" may refer to one or more applications, programs, routines, sub-routines, functions, procedures, etc.

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium and may be part of a computer-program product. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for preparing a system with a confidence based ranking algorithm, comprising:
    receiving at least one data record;
    determining a confidence value for each attribute value in each data record, wherein the determining comprises evaluating accuracy, not frequency, of each attribute value;
    associating at least one confidence value with each attribute value for each data record and using a unique identifier for each record, wherein the unique identifier and the confidence value are combined to form an ordered pair;
    storing at least one attribute value and at least one associated confidence value for each data record;
    creating a searchable data structure based on the attribute values and their associated confidence values; and
    updating the searchable data structure based on periodically determined associated confidence values, wherein the periodic determination occurs independent of the frequency at which the data is received.

2. The method of claim 1, wherein the receiving further comprises receiving non-uniform data records from more than one source.

3. The method of claim 2, wherein the receiving further comprises combining the data into a single data structure.

4. The method of claim 2, wherein the receiving further comprises mapping the non-uniform data records into uniform records.

5. The method of claim 2, wherein the non-uniform data records from more than one source comprises data records with different naming conventions and file structures.

6. The method of claim 4, wherein mapping the non-uniform data records into uniform records comprises assigning a common set of attribute labels to each of the non-uniform data records.

7. The method of claim 4, wherein data that is unchanged during mapping from the at least one data record receives a 100% confidence value.

8. The method of claim 1, wherein the searchable data structure is an inverted index sorted by unique identifier and attribute value.

9. The method of claim 1, wherein the ordered pair consists of two values, the first value being the unique identifier and the second value being the confidence value.

10. The method of claim 1, wherein the unique identifier is obtained from the at least one received data record.

11. The method of claim 1, wherein the searchable data structure comprises a subset of the at least one data record.

12. The method of claim 1, wherein the associated confidence values are periodically determined at least once per day.

13. The method of claim 1, wherein the associated confidence value is zero.

14. The method of claim 1, wherein the confidence value is obtained from the at least one received data record.

15. The method of claim 1, wherein the sum of confidence values for an attribute value exceeds 100%.

16. An apparatus for preparing a system with confidence based ranking algorithm, the apparatus comprising:
    a processor;

memory in electronic communication with the processor, wherein the memory includes instructions that are executable to:

receive at least one data record;

determine a confidence value for each attribute value in each data record, wherein the determining comprises evaluating accuracy, not frequency, of each attribute value and using a unique identifier for each record, wherein the unique identifier and the confidence value are combined to form an ordered pair;

associate at least one confidence value with each attribute value for each data record;

store at least one attribute value and at least one associated confidence value for each data record;

create a searchable data structure based on the attribute values and their associated confidence values; and update the searchable data structure based on periodically determined associated confidence values, wherein the periodic determination occurs independent of the frequency at which the data is received.

17. The apparatus of claim 16, wherein the instructions for receiving further comprise instructions for receiving non-uniform data records from more than one source.

18. The apparatus of claim 17, wherein the instructions for receiving further comprise instructions for combining the data into a single data structure.

19. The apparatus of claim 17, wherein the instructions for receiving further comprise instructions for mapping the non-uniform data records into uniform records.

20. The apparatus of claim 16, wherein the instructions for creating a searchable data structure further comprise instructions for creating an inverted index sorted by unique identifier.

* * * * *